United States Patent [19]
Groh

[11] Patent Number: 5,759,260
[45] Date of Patent: Jun. 2, 1998

[54] METHOD FOR USING LIGHTWEIGHT CONCRETE FOR PRODUCING A COMBINATION THEREFROM AND A COMBINATION PRODUCED THEREBY

[75] Inventor: Richard E. Groh, Florence, Oreg.

[73] Assignee: Rigro Inc., Florence, Oreg.

[21] Appl. No.: 589,901

[22] Filed: Jan. 23, 1996

Related U.S. Application Data

[63] Continuation of Ser. No. 148,670, Nov. 4, 1993, abandoned, which is a continuation-in-part of Ser. No. 93,370, Jul. 16, 1993, abandoned.

[51] Int. Cl.$^6$ .......................... C04B 14/16; C04B 14/18; C04B 14/04
[52] U.S. Cl. .......................... 106/672; 106/675; 106/679; 106/698; 106/705; 264/DIG. 49
[58] Field of Search .......................... 106/672, 675, 106/698, 705, DIG. 1, DIG. 2, 679; 264/DIG. 49

[56] References Cited

U.S. PATENT DOCUMENTS

| | | |
|---|---|---|
| 2,572,483 | 10/1951 | Howle . |
| 2,585,366 | 2/1952 | Bollaert et al. . |
| 2,669,409 | 2/1954 | Parsons . |
| 2,727,827 | 12/1955 | Chertkof . |
| 2,728,733 | 12/1955 | Hashimoto . |
| 2,858,227 | 10/1958 | Rodsky . |
| 3,051,590 | 8/1962 | Froux . |
| 3,100,715 | 8/1963 | Leonard . |
| 3,473,689 | 10/1969 | Hutter . |
| 3,565,650 | 2/1971 | Cordon . |
| 3,630,762 | 12/1971 | Olton et al. . |
| 3,661,604 | 5/1972 | Artmann ..................... 106/98 |
| 3,705,838 | 12/1972 | Olton et al. . |
| 3,847,633 | 11/1974 | Race . |
| 3,869,295 | 3/1975 | Bowles et al. . |
| 3,899,344 | 8/1975 | Jakel . |
| 3,900,347 | 8/1975 | Lorenzetti et al. . |
| 3,933,182 | 1/1976 | Costes . |
| 3,979,870 | 9/1976 | Moore . |
| 3,992,216 | 11/1976 | Kirschner . |
| 4,042,406 | 8/1977 | Gray . |
| 4,158,275 | 6/1979 | Moore . |
| 4,203,456 | 5/1980 | Miller . |
| 4,222,785 | 9/1980 | Henderson . |
| 4,259,824 | 4/1981 | Lopez . |
| 4,293,341 | 10/1981 | Dudley et al. . |
| 4,328,178 | 5/1982 | Kossatz . |
| 4,332,907 | 6/1982 | Vieli . |
| 4,362,566 | 12/1982 | Hinterwaldner . |
| 4,372,092 | 2/1983 | Lopez . |
| 4,373,955 | 2/1983 | Bouchard et al. . |
| 4,398,960 | 8/1983 | Murray . |
| 4,406,241 | 9/1983 | Comte . |
| 4,492,087 | 1/1985 | Schäfer et al. . |
| 4,501,830 | 2/1985 | Miller et al. . |
| 4,504,318 | 3/1985 | Matsuda et al. . |
| 4,504,320 | 3/1985 | Rizer et al. . |
| 4,524,756 | 6/1985 | Laverman . |
| 4,572,864 | 2/1986 | Benson et al. . |
| 4,622,251 | 11/1986 | Gibb . |
| 4,641,470 | 2/1987 | Baumberger . |
| 4,655,802 | 4/1987 | Jaumann . |
| 4,689,358 | 8/1987 | Schorr et al. . |
| 4,707,956 | 11/1987 | Sato . |
| 4,759,992 | 7/1988 | Tomko et al. . |
| 4,803,107 | 2/1989 | Knowles . |
| 4,814,013 | 3/1989 | Guzeev et al. . |
| 4,840,672 | 6/1989 | Baes . |
| 4,863,519 | 9/1989 | Holm ..................... 106/97 |
| 4,895,598 | 1/1990 | Hedberg et al. . |
| 4,913,751 | 4/1990 | Schmitt et al. . |
| 4,963,191 | 10/1990 | LaFleur . |
| 4,994,505 | 2/1991 | Gerber . |
| 5,059,371 | 10/1991 | Saheki et al. . |
| 5,072,774 | 12/1991 | Schilcher . |
| 5,080,022 | 1/1992 | Carlson . |
| 5,096,748 | 3/1992 | Balassa . |
| 5,112,405 | 5/1992 | Sanchez . |
| 5,114,617 | 5/1992 | Smetana et al. . |
| 5,143,780 | 9/1992 | Balassa . |

*Primary Examiner*—Michael Marcheschi
*Attorney, Agent, or Firm*—Marger Johnson McCollom & Stolowitz, P.C.

[57] ABSTRACT

This invention is directed to a lightweight concrete combination. The combination includes a lightweight concrete product having auxiliary structures, such as at least one fastener, embedded therein. The lightweight concrete product comprises (a) cement and (b) a lightweight additive material. The invention also relates to a method for using the lightweight concrete product, and to a method for producing the lightweight concrete combination.

30 Claims, 2 Drawing Sheets

METHOD FOR USING LIGHTWEIGHT CONCRETE FOR PRODUCING A COMBINATION THEREFROM AND A COMBINATION PRODUCED THEREBY

This application is a continuation of application Ser. No. 08/148,670, filed Nov. 4, 1993, now abandoned which is a continuation-in-part of Ser. No. 08/093,370, filed Jul. 16, 1993, now abandoned.

BACKGROUND OF THE INVENTION

The present invention relates to a method of using lightweight concrete to produce a novel combination, to a method for producing the novel lightweight concrete combination, and to the lightweight concrete combination itself.

Hydraulic cements, solids that set up and harden irreversibly in the presents of water, have been known for hundreds of years. In recent years, lightweight or low density concretes having low weight aggregates have been developed having satisfactory structural strength for the purposes for which they are employed, and having acceptable insulation value and fire resistance.

It is desirable to utilize concrete products which are lightweight, yet strong and durable, for example, in applications where handling of heavier structures is a problem. Heretofore, lightweight concrete designs have suffered from the drawback that the lightweight aggregates, i.e., the natural sands, gravels and crushed stones used for mixing with the cementing material, employed are highly water absorbent. Consequently, higher than normal water demand occurs, resulting in slow set up times and weak and highly porous cement.

Lightweight aggregates which employe perlite minerals and the like are known. For example, U.S. Pat. No. 2,727,827 lightweight insulating concrete has been shown to be produced using perlite in the product mixture along with a non-ionic, surface active water-soluble polyoxyethylene thioether. In U.S. Pat. No. 3,847,633, an improved building material is produced which includes portland cement, lightweight perlite aggregate, plaster of paris, flyash, vermiculite, fiberglass, and sodium silicate. In U.S. Pat. No. 2,585,366, a lightweight concrete of Portland cement, artificially expanded perlite aggregate, and silica, in specific weights and ranges is employed.

In U.S. Pat. No. 5,080,022, a concrete product is described comprising 30–85% by weight of cement and 15–70% by weight of perlite finds consisting of particles less than 200 mesh in size.

The use of perlite, particularly in the expanded form, and portland cement is also described in the following U.S. Pat. Nos. 2,858,227, 3,051,590, 3,100,715, 3,565,650, 3,705,838, 3,899,344, 4,293,341, 4,689,358, 3,992,216, 4,042,406, 4,158,275, 4,895,598, 4,373,955.

In U.S. Pat. No. 5,114,617, a high strength structural perlite concrete is produced which comprises 8–60% cement, 0.5–20% smooth-surface, vesicular, expanded perlite, 0–12% pozzolan, 0–70% fine aggregate, and 0–60% course aggregate, while the lightweight aggregate in U.S. Pat. No. 4,222,785 includes cement, sand, course aggregate, perlite, and ash.

Another material employed in the fabrication of lightweight high strength concrete is pumice. In U.S. Pat. No. 4,259,824 for example, pumice is used along with volcanic scoria, a suitable fibrous material and a suitable fibrous material such as chopped fiberglass. In U.S. Pat. No. 4,803,107, a thermal insulation material is produced from pumice, scoria, and cement.

Another material used in lightweight concrete and plaster is pozzolan. See U.S. Pat. Nos. 3,3,869,295 and 4,504,320. Other lightweight concrete materials are described in U.S. Pat. Nos. 3,869,295, 4,501,830 and 4,504,320.

Conventional concretes have the problem that they intend to spall, i.e., crack and or chip, when they are impacted. Thus, when auxiliary structures which are to be attached to or embedded into the concrete, auxiliary attachment means must be provided during pre-form or casting of the concrete structures in order for these *auxiliary embedded structures to be supported during use. This is a costly, time-consuming process.

Accordingly, a need remains for a lightweight concrete product which is able to receive and retain auxiliary structures by embedding same directly within the interstices of the concrete product itself, without requiring auxiliary attachment means during the pre-form stage and without spalling thereof, particularly in the area that the auxiliary attachment means is embedded.

SUMMARY OF THE INVENTION

The above-described need has now been met by the lightweight concrete combination of the present invention.

This invention is directed to a lightweight concrete combination. The combination includes a lightweight concrete product having auxiliary structures, such as at least one fastener, embedded therein. The lightweight concrete product comprises (a) cement and (b) a lightweight additive material. The invention also relates to a method for using the lightweight concrete product, and to a method for producing the lightweight concrete combination.

The cement employed in the lightweight concrete product is typically portland cement. Another particular product is a plasticized cement sold under the trademark Calavares®, which is manufactured by the Calvaras Cement Company. This imparts a level of homgeniety to the final lightweight concrete product mixture and provides the ability of preventing separation of the individual components of the mixture. The stabilizer prevents separation of the individual components of the product mix. Other additives which can be part of the concrete ingredient mixture include accelerators, retardants, air entrainment compounds, water reducing compounds and plasticizers.

The lightweight concrete product includes a lightweight additive material which conveys the lightweight nature to the product. It also facilitates the formation of an internal matrix in the interstices of the product which permits auxiliary structures, such as at least one fastener, to be embedded and retained therewithin. The inorganic additive material generally comprises at least one of perlite, pumice and pozzolan. Perlite is typically a volcanic glass that has a concentric shelly structure, appears as if composed of concretions, which is usually grayish and sometimes spherulitic. The perlite is expanded by heat and forms a lightweight aggregate used especially in concrete. Pumice is a volcanic glass full of cavities and very light in weight used in powder form for smoothing and polishing. One of the preferred product for use in this invention is Glass Mountain pumice sold by Glass Mountain Pumice, Inc. of Tulelake, Calif. Another preferred lightweight material is Bend Red, which is a fine pumice material distributed by Graystone, located in Bend, Oregon. Pozzolan is finely divided siliceous or siliceous and aluminous material that reacts chemically with slaked lime at ordinary temperature and in the presence of moisture to form as a slow-hardening cement. Other preferred lightweight additive materials include vermiculite and coral.

In any case, the lightweight additive material must be a combination of course and fine aggregate components. Preferably, the fine aggregate material employed in the product of the present invention must pass through a standard No. 4 sieve. Preferably, the lightweight course aggregate material has a maximum particle size of up to ½", more preferably up to ⅜", and most preferably up to ¼".

The unit weight of the lightweight concrete product is particularly maintained below a maximum predetermined level for purposes of ease of handling by an end user and for minimizing costs. The unit weight of the lightweight concrete product is determined according to ASTM C138 (ASTM C567 Lightweight). The unit weight of the lightweight concrete product is preferably maintained at not more than about 80 pounds per cubic foot, preferably maintained at not more than about 75 pounds per cubic foot, and most preferably maintained at not more than about 70 pounds per cubic foot.

The subject lightweight concrete product also exhibits excellent strength properties in spite of its relatively low unit weight. More specifically, the lightweight concrete product preferably has a compressive strength of at least about 1,000 psi, more preferably at least about 1,500 psi, and most preferably at least about 2,000 psi. The above strength properties are determined by making and curing specimens according to ASTM C192, the compressive cylinders employed in as test samples being formed according to ASTM C39 (ASTM C495 lightweight).

The lightweight concrete product of this invention also evidences excellent fire resistance properties. Fire resistance testing is generally conducted as per ASTM E119.

Finally, the subject concrete product exhibits a steady-state thermal performance as evidenced by its exceptional overall air to air thermal resistance (R Value) per inch of concrete product. The R Value was determined by the use of ASTM C236-89. This test measures the thermal performance of building construction assemblies and building panels. For conventional concrete building assemblies or building panels, the R Value per inch of thickness of such assemblies or panels is up to about 1.0, and typically much less than 1.0. However, the overall thermal resistance per inch of the R Value per inch of thickness for the concrete product produced in accordance with the teachings of this invention, is typically at least about 1.25, preferably at least about 1.5, and more preferably at least about 1.75 and most preferably at least about 2.0. Stated another way, for a building assembly or panel made by the process of the present invention and having a 6" thickness, the R Value is typically at least about 7.5, preferably at least about 9, and more preferably at least about 10.5 and most preferably at least about 12.

In additional to the above-described properties, this lightweight concrete product can be used to produce a novel lightweight concrete combination. The lightweight concrete combination is produced by attaching an auxiliary structure thereto using at least one fastener as described below. For example, an auxiliary structure in the form of a fixture or the like can be directly fastened to the lightweight concrete product of this invention without having to connect ancillary fastening means thereinto during the lightweight concrete product formation process. This provides the end user with the ability to attach an auxiliary structure to the lightweight concrete product at any point thereon after formation thereof employing any of the hereinafter described fasteners.

Unexpectedly, a fastener, and in turn the ancillary structure it affixes to the subject product, can be retained in that lightweight concrete product in a manner similar to its retention when attached to a wood substrate. Moreover, these fasteners can be embedded in the lightweight concrete product without creating visible spalling in the area that they are embedded. This is contrary to the conventional concrete products which have been previously discussed. With respect to the lightweight concrete product of the present invention, it has been found to be deformable. Therefore, although depressions may be formed in the product surface, it will not undergo spalling as is typical of convention concrete products. This is a further characteristic property of the subject lightweight concrete product which is similar to wood.

The lightweight concrete product exhibits ultimate load properties for extraction of various types of fasteners embedded therein which are comparable to the ultimate load properties of wood. Thus, nails, screws, staples, eyebolts, and lag screws, were each introduced into the lightweight concrete product of the subject invention and into wood. They were inserted by manual introduction and by air driven devices.

Fastener ultimate load (extraction) and fastener ultimate load (shear) were determined pursuant to ASTM-D1761. In the fastener ultimate load extraction and shear tests for concrete, nominal 4"×8"×16" (3.5"×7.5"×16") rectangular blocks of the lightweight concrete product or comparable wood test blocks were employed in the above-described testing (see FIGS. 1–6). The fasteners used in testing fastener ultimate load (extraction) and fastener ultimate load (shear) embedded in the subject lightweight concrete product were 16d nails, #10 screws, ¼" diameter lag screws, 3/8" diameter×3", 3½", and 6" length eyebolts, and 15 gauge staples. The nails (air gun and hammer), screws and staples were introduced into the test block 2.5" from its longitudinal edges. The lag screws were introduced into the center of the test block. In extraction testing, the nails, screws and staples protruded out of the test block surface ¾". In the shear tests, a wood or concrete first base block configured as described above has a ½"×6"×12" (nominally ⅝"×5.5"×12") second test block attached thereto. The nails (air gun and hammer), screws and staples were introduced into the second test block 3" from the lateral ends of the second block.

For manually introduced fasteners, for example, hammered 16d nails, the preferred ultimate load (extraction) is at least about 10 pounds, more preferred at least about 20 pounds, and most preferred at least about 50 pounds. For manually introduced #10 screws, the preferred ultimate load (shear) is at least about 300 pounds, more preferred at least about 400 pounds, and most preferred at least about 500 pounds. For manually introduced 15 gauge staples, the preferred ultimate load (shear) is at least about 200 pounds, more preferred at least about 300 pounds, and most preferred at least about 400 pounds. For manually introduced ¼" lag screws—2" deep, the preferred ultimate load (shear) is at least about 1,500 pounds, more preferred at least about 1,750 pounds, and most preferred at least about 2,000 pounds.

For fasteners which are air-driven into the lightweight concrete product, for example, the preferred ultimate load (extraction) for 16d nails is at least about 50 pounds, more preferred at least about 100 pounds, and most preferred at least about 150 pounds, and for 15 gauge staples is at least about 60 pounds, more preferred at least about 75 pounds, and most preferred at least about 90 pounds.

The lightweight concrete product is typically prepared by combining (a) cement, (b) a lightweight inorganic additive material, and (c) water in a mixing apparatus. For purposes of preparing test samples, a ⅓ yard motorized concrete mixer was used. In commercial applications, however, a full size concrete mixer is typically employed. The lightweight concrete product preferably comprises from about 20 to 50 weight % of (a) the cement, and from about 50 to 80 weight % of (b) the lightweight inorganic additive material, and more preferably comprises from about 25 to 40 weight % of (a) the cement, from about 60 to 75 weight % of (b) the lightweight inorganic additive material. All of the weight % of (a) and (b) are based on the total anhydrous weight of the lightweight concrete product. In order to make the requisite lightweight concrete product, an amount of water is added to the combined cement and lightweight inorganic additive material to form a consolidated concrete mixture which will exhibit a minimum amount of slump, preferably no slump at all.

DETAILED DESCRIPTION OF A PREFERRED EMBODIMENT

EXAMPLE 1

Figure 1:
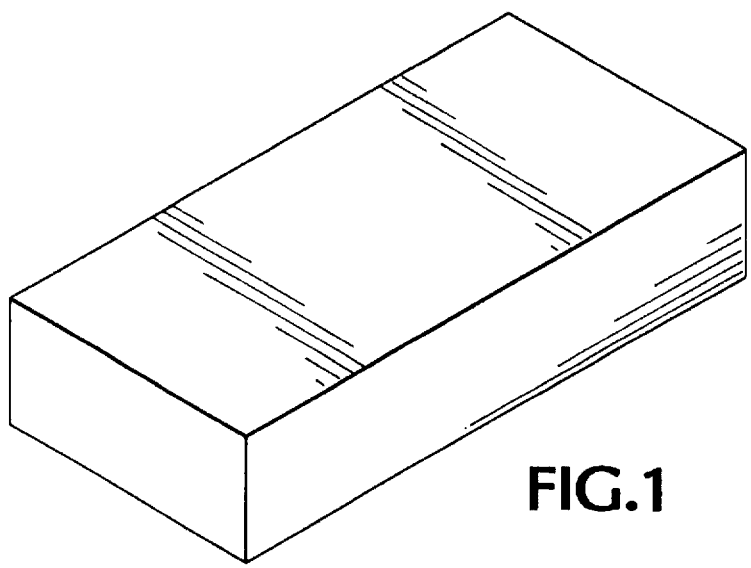
FIG. 1 is a perspective view of a concrete sample block having a 3.5"×7.5"×16" dimension which is made in accordance with the present invention and which is employed in the fastener extraction tests.

These experiments were conducted to determine the physical properties, namely, compressive strengths and unit weights, of various concrete products of the present invention. The procedures listed below were followed:

a. Experimental Batch Nos. 1-1 through 1-3 were prepared by mixing varying amounts of Portland cement and a lightweight inorganic additive material, such as pozzolan and/or perlite and/or pumice, in a ⅓ yard motorized concrete mixer, with an amount of water sufficient to produce a consolidated concrete product having a minimum amount of slump or no slump.

b. Here are Batch Nos. 1-1 through 1-3:

| Formulation | Amount (lbs) |
| --- | --- |
| Batch No. 1-1 | |
| Portland Cement | 21.5 |
| Crater Rock (pumice)-¼" minus | 42.0 |
| Perlite | 3.0 |
| Pozzolan | 2.0 |
| Batch No. 1-2 | |
| Portland Cement | 21.0 |
| Crater Rock (pumice)-¼" minus | 42.0 |
| Bend Red (pumice)-¼" minus | 10.0 |
| Batch No. 1-3 | |
| Portland Cement | 21.0 |
| Crater Rock (pumice)-¼" minus | 18.0 |
| Bend Red (pumice)-¼" minus | 9.0 |
| Perlite | 2.0 |
| Pozzolan | 1.5 | c. Concrete cylinders, in accordance with ASTM C192, were made from each mixture and then cured. Approximate unit weights were obtained by weighing the concrete cylinders (which were of predetermined volume).

d. The cylinders were tested for compressive strength, in accordance with ASTM C39. Results at twenty-eight (28) days were obtained.

e. The typical unit weights and compressive strengths for each Batch No. 1-1 through 1-3 is as follows:

| Batch No. | Unit Wgt. | Compressive Strength |
| --- | --- | --- |
| 1-1 | 65 lbs | 1070 psi |
| 1-2 | 64 lbs. | 2190 psi |
| 1-3 | 70 lbs | 1308 psi |

It is clear that by employing the method of the present invention various lightweight concrete products can be produced having a compressive strength of at least about 1000 psi and a unit weight of not more than about 80 pounds per cubic foot.

EXAMPLE 2

These experiments were conducted to confirm the fastening capabilities of the concrete product. These fastening capabilities were determined by experimently testing the ability of the subject concrete product to accept and retain a range of typical fasteners such as nails, screws, staples and lag bolts. The procedures listed below were followed:

a. Experimental Batch Nos. 2-1 and 2-2 were prepared according to the procedure outlined in Example 1, paragraph a.

b. Here are Batch Nos. 2-1 and 2-2 mixtures:

| Formulation | Amount (lbs) |
| --- | --- |
| Batch No. 2-1 (63 lbs) | |
| Plasticized Calavares ® Cement | 24.0 |
| Crater Rock (pumice)-¼" minus | 32.0 |
| Crater Rock (pumice)-⅛" minus | 5.0 |
| Perlite (338 cubic inches) | 1.0 |
| Batch No. 2-2 (67 lbs) | |
| Plasticized Calavares ® Cement | 24.0 |

-continued

Figure 2:
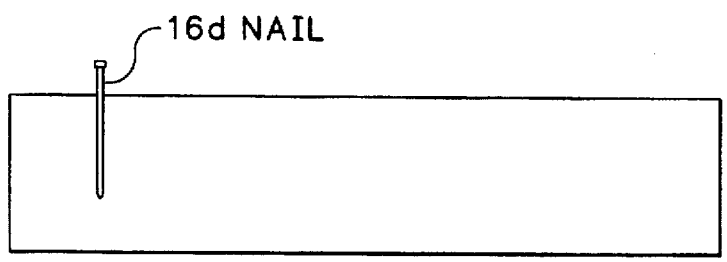
FIG. 2 is an side view of the concrete sample block of FIG. 1 showing the extent of the fastener protrusion of a 16d nail out from the upper surface of, and into, the block for purposes of conducting the fastener extraction tests.
Figure 3:
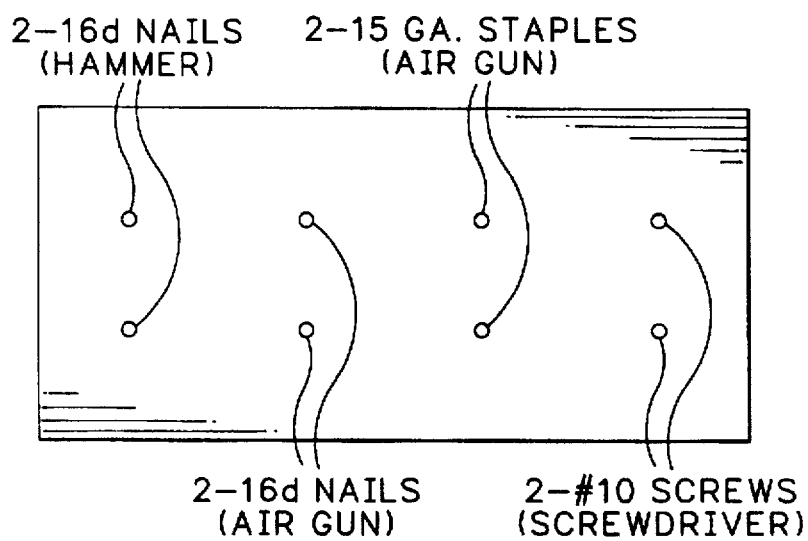
FIG. 3 is a plan view of the concrete sample block of FIG. 1 showing the location of the 16d nails, the #10 screws, and the 15 gauge staples for purposes of conducting the fastener extraction tests.
Figure 4:
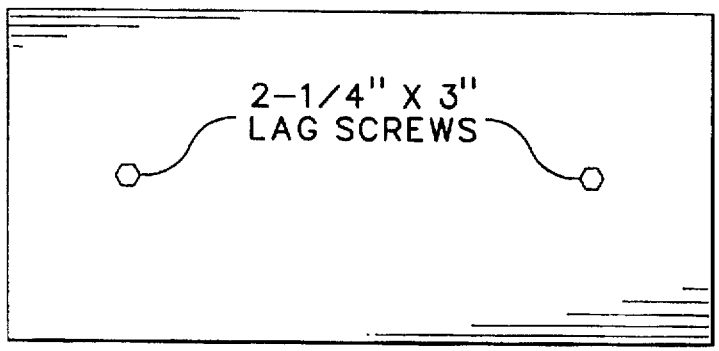
FIG. 4 is a plan view of the concrete sample block of FIG. 1 showing the location of the ¼"×3" lag screws for purposes of conducting the fastener extraction tests.
Figure 5:
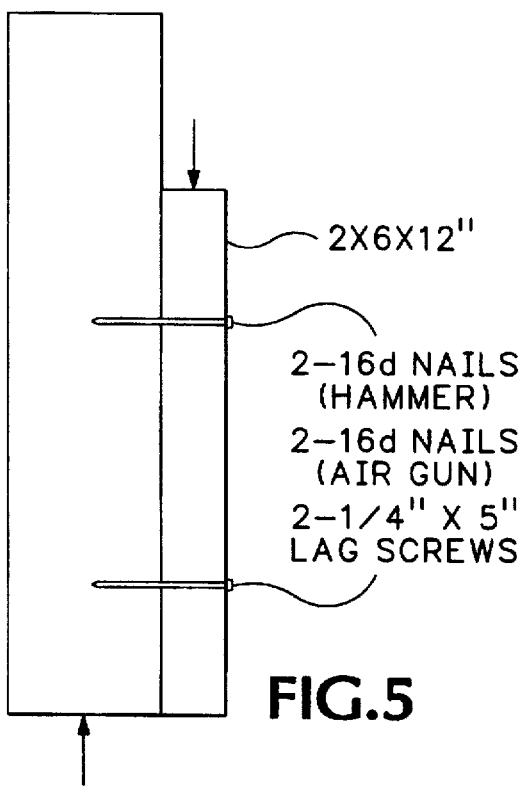
FIG. 5 is a side view of the concrete sample block of FIG. 1 having a wood block attached thereto showing the location of the 16d nails and ¼" lag screws for purposes of conducting the fastener extraction tests.
Figure 6:
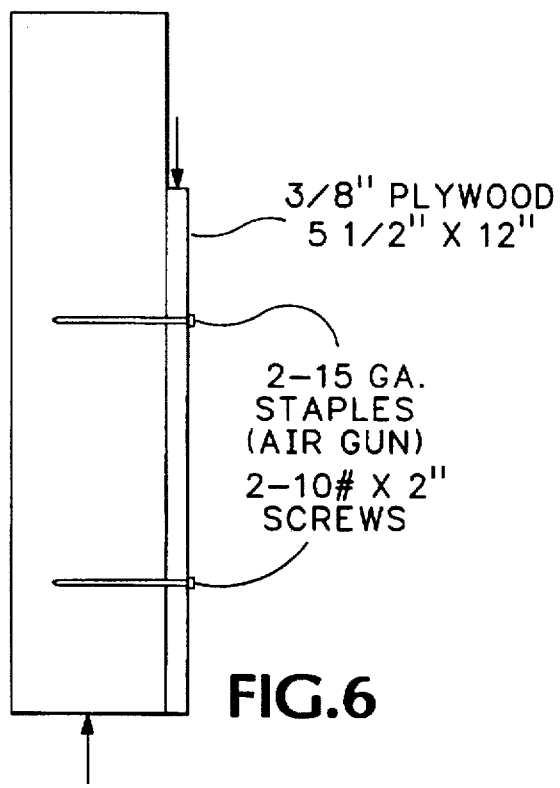
FIG. 6 is a side view of the concrete sample block of FIG. 1 having a wood block attached thereto showing the location of #10 screws and the 15 gauge staples for purposes of conducting the fastener extraction tests.

| Formulation | Amount (lbs) |
|---|---|
| Crater Rock (pumice)-¼" minus | 33.0 |
| Crater Rock (pumice)-½" minus | 5.0 |
| Crater Rock (pumice)-⅛" minus | 4.0 |
| Perlite (200 cubic inches) | 0.75 | c. 4"×8"×16" blocks of concrete prepared according the procedure of paragraph a. above were cast from Batch Nos. 2-1 and 2-2 for use in fastener tests. One (1) set of cylinders (three (3) cylinders per set) were to document the compression strength for the fastener block samples.

d. Nails, staples, screws and lag bolts were installed into the concrete blocks, in manners shown in FIGS. 1–6, for extraction and shear tests, respectively.

e. Fastener tests were performed in accordance with ASTM D1761, and the results documented. The average concrete strength of the lightweight concrete samples tested was 1195 psi. Here is a summary of the fastening capability test results:

| Test Type | Anchor Type | Ultimate Load (lbs.) | Type of Failure |
|---|---|---|---|
| Batch No. 2-1 | | | |
| Shear | #10 Screw - Plywood to Concrete | 530 | Bent Screw |
| Extraction | 16d Nails - Hammered into Concrete | 20/60 | Extracted Nails |
| Extraction | 16d Nail - Air Driven to Concrete | 60/55 | Extracted Nail |
| Shear | Staple - Plywood to Concrete | 435 | Bent Staple |
| Extraction | Screws - In Concrete | 205 | Extracted Screw |
| Shear | ¼" Lag Screw - 2" Deep Plywood Over Concrete | 2,025 | Bent Screw |
| Batch No. 2-1 | | | |
| Shear | #10 Screw - Plywood to Concrete | 700 | Bent Screw |
| Extraction | 16d Nails - Hammered into Concrete | 80/100 | Extracted Nails |
| Extraction | 16d Nail - Air Driven to Concrete | 160/245 | Extracted Nail |
| Shear | Staple - Plywood to Concrete | 725 | Bent Staple |
| Extraction | Screws - In Concrete | 320 | Extracted Screw |
| Shear | ¼" Lag Screw - 2" Deep Plywood Over Concrete | 3100 | Bent Screw |

It is clear that by employing the method of the present invention lightweight concrete products having fastening acceptance and retention properties significantly higher than conventional concrete products can be formed. These fastening acceptance and retention properties are comparable to those exhibited by various wood substrates. The specific novel fastening properties include a high level of both shear and extraction capabilities for a number of types of fasteners which have been both manually-driven or air-driven into the interstices of the subject lightweight concrete products.

EXAMPLE 3

This experiment was conducted to confirm the overall air to ar thermal resistance capabilities (R Value) of the subject concrete product. These thermal resistance capabilities were determined by experimentally testing the steady-state thermal performance of the subject concrete product by means of a guarded hot box according to ASTM C236-89. The test conditions were as follows:

| | |
|---|---|
| Average Hot Air Temperature | 77.9 F. |
| Average Hot Air Temperature | 21.7 F. |
| Hot Air to Cold Air Differential | 59.1 F. |
| Average Hot Surface Temperature | 75.1 F. |
| Average Cold Surface Temperature | 47.7 F. |
| Hot Surface to Cold Surface Differential | 35.1 F. |
| Average Heat Input | 33.6 Watts |

The procedures listed below were followed:

a. Experimental Batch Nos. 3-1 was prepared according to the procedure outlined in Example 1, paragraph a.

b. Here is the Batch No. 3-1 formulation:

| Batch No. 3-1 (About 7 ft³) | |
|---|---|
| Formulation | Amount |
| plasticized Calavares ® Cement | 168 lbs |
| Crater Rock (pumice)-½" minus | 210 lbs |
| Crater Rock (pumice)-¼" minus | 40 lbs |
| Crater Rock (pumice)-⅛" minus | 30 lbs |
| Perlite (150 cubic inches-⅛" minus) | 0.5 gallon |

A 4'×8'×6" wall formed of the subject lightweight concrete product was prepared according the procedure of paragraph 1. a. above, and was cast from the concrete mixture of Batch Nos. 3-1 for use in the thermal resistance tests. When the product was tested, the R value was found to be 16.5, the R value per inch of lightweight concrete product thickness is 2.75, and the overall air to air thermal conductance was 0.06. Concrete mortar has an R value per inch of product thickness of 0.20. Thus, it can be concluded that the lightweight concrete of this invention has a high steady-state thermal capability, and particularly as compared to concrete mortar per se.

I claim:

1. A method of producing a lightweight concrete product, which comprises:

forming said lightweight concrete product from a mixture consisting essentially of water, plasticized cement and an inorganic additive material which is selected from at least one of perlite, pumice or pozzolan, said lightweight concrete product having a compressive strength of at least about 1,000 psi and a unit weight of not more than about 80 pounds per cubic foot; and embedding and retaining at least one fastener into said lightweight concrete product, after formation thereof, without creating visible spalling in an area that said fastener is embedded, the lightweight concrete product having an ultimate load (extraction) for a 16d nail manually embedded and retained therein of at least about 10 pounds.

2. The method of claim 1, wherein said inorganic additive material has a maximum particle size of up to ½".

3. The method of claim 1, wherein said inorganic additive material is present in an amount of from about 50 up to 80 weight %, based on the total weight of said lightweight concrete product.

4. The method of claim 1, wherein said unit weight of said lightweight concrete product is not more than about 75 pounds per cubic foot.

5. The method of claim 1, wherein the ultimate load (extraction) of a 16d nail which is air driven into said lightweight concrete product is at least about 50 pounds.

6. The method of claim 1, wherein an ultimate load(shear) for a #10 screw manually introduced into said lightweight concrete product is at least about 300 pounds.

7. The method of claim 1, wherein an ultimate load (shear) for a ¼" lag screw manually introduced into said lightweight concrete product is at least about 1,500 pounds.

8. The method of claim 1, wherein the lightweight concrete product has an R Value per inch of thickness of at least about 1.25.

9. A method for producing a lightweight concrete product having at least a fastener embedded therewithin, which comprises;

forming said lightweight concrete product from a mixture consisting essentially of water, Portland Cement, and an inorganic additive material which is selected from at least one of perlite, pumice or pozzolan, said lightweight concrete product having a compressive strength of at least about 1,000 psi and a unit weight of not more than about 80 pounds per cubic foot; and embedding and retaining at least one fastener into said lightweight concrete product, after formation thereof, without creating visible spalling in an area that said fastener is embedded, the lightweight concrete product having an ultimate load (extraction) for a 16d nail manually embedded and retained therein of at least about 10 pounds.

10. The method of claim 9, wherein said inorganic additive material has a maximum particle size of up to ½".

11. The method of claim 9, wherein said inorganic additive material is present in an amount of from about 50 up to 80 weight %, based on the total weight of said lightweight concrete product.

12. The method of claim 9, wherein said unit weight of said lightweight concrete product is not more than about 75 pounds per cubic foot.

13. The method of claim 9 wherein the ultimate load (extraction) of a 16d nail which is air driven into said lightweight concrete product is at least about 50 pounds.

14. The method of claim 9, wherein an ultimate load (shear) for a #10 screw manually introduced into said lightweight concrete product is at least about 300 pounds.

15. The method of claim 9, wherein an ultimate load (shear) for a ¼" lag screw manually introduced into said lightweight concrete product is at least about 1,500 pounds.

16. The method of claim 9, wherein an R Value per inch of thickness of said lightweight concrete product is at least about 1.25.

17. A method of producing a lightweight concrete product having at least one fastener embedded therewithin, which comprises;

forming said lightweight concrete product, consisting essentially of water, cement and an inorganic additive material which is selected from at least one of perlite, pumice or pozzolan, said lightweight concrete product having a compressive strength of at least about 1,000 psi and a unit weight of not more than about 80 pounds per cubic foot; and embedding and retaining at least one fastener into said lightweight concrete product, after formation thereof, without creating visible spalling in an area that said fastener is embedded, the lightweight concrete product having an ultimate load (extraction) for a 16d nail manually embedded and retained therein of at least about 10 pounds.

18. The method of claim 17, wherein said inorganic additive material has a maximum particle size of up to ½".

19. The method of claim 17, wherein said inorganic additive material is present in an amount of from about 50 up to 80 weight %, based on the total weight of said lightweight concrete product.

20. The method of claim 17, wherein said unit weight of said lightweight concrete product is not more than about 75 pounds per cubic foot.

21. The method of claim 17, wherein the ultimate load (extraction) of a 16d nail which is air driven into said lightweight concrete product is at least about 50 pounds.

22. The method of claim 17, wherein an ultimate load (shear) for a #10 screw manually introduced into said lightweight concrete product is at least about 300 pounds.

23. The method of claim 17, wherein an ultimate load (shear) for a ¼" lag screw manually introduced into said lightweight concrete product is at least about 1,500 pounds.

24. The method of claim 17, wherein an R Value per inch of thickness of said lightweight concrete product is at least about 1.25.

25. A lightweight concrete product having at least one fastener embedded therein, without creating visible spalling in an area that said fastener is embedded, said lightweight concrete product (a) consisting essentially of plasticized cement and an inorganic additive material which is selected from at least one of perlite, pumice or pozzolan, (b) having a compressive strength of at least about 1,000 psi, (c) a unit weight of not more than about 80 pounds per cubic foot, and (d) an ultimate load (extraction) for a 16d nail manually embedded therein of at least about 10 pounds.

26. The product of claim 25, wherein said inorganic additive material is present in an amount of from about 50 up to 80 weight %, based on the total weight of said lightweight concrete product.

27. The product of claim 25, wherein an ultimate load (shear) for a #10 screw manually introduced into said lightweight concrete product is at least about 300 pounds.

28. The product of claim 25, wherein an ultimate load (extraction) of a 16d nail which is air driven into said lightweight concrete product is at least about 50 pounds.

29. The product of claim 25, wherein an ultimate load (shear) for a ¼" lag screw manually introduced into said lightweight concrete product is at least about 1,500 pounds.

30. The product of claim 25, wherein an R Value per inch of thickness of said lightweight concrete product is at least about 1.5.

* * * * *